(12) United States Patent
Hancock

(10) Patent No.: US 8,679,566 B1
(45) Date of Patent: Mar. 25, 2014

(54) METHOD OF MAKING FROZEN CONFECTIONS

(76) Inventor: Jerry Hancock, American Fork, UT (US)

( * ) Notice: Subject to any disclaimer, the term of this patent is extended or adjusted under 35 U.S.C. 154(b) by 1167 days.

(21) Appl. No.: 11/431,389

(22) Filed: May 9, 2006

Related U.S. Application Data

(60) Provisional application No. 60/680,439, filed on May 12, 2005.

(51) Int. Cl.
*A23L 3/36* (2006.01)
*A23L 3/375* (2006.01)

(52) U.S. Cl.
USPC ............ 426/524; 426/565; 426/319; 426/100

(58) Field of Classification Search
USPC .......... 426/312, 319, 565, 658, 474, 524, 100
See application file for complete search history.

(56) References Cited

U.S. PATENT DOCUMENTS

| | | | |
|---|---|---|---|
| 3,068,105 A * | 12/1962 | Morrison | 62/70 |
| 4,310,559 A | 1/1982 | Mita et al. | |
| 4,942,910 A | 7/1990 | Hamamura | |
| 5,098,732 A | 3/1992 | Inagaki | |
| 5,126,156 A | 6/1992 | Jones et al. | |
| 5,475,984 A | 12/1995 | Fermani et al. | |
| 5,522,227 A | 6/1996 | Appolonia | |
| 5,664,422 A | 9/1997 | Jones | |
| 5,987,898 A | 11/1999 | Olofsson et al. | |
| 6,000,229 A | 12/1999 | Jones et al. | |
| 6,025,003 A | 2/2000 | Jadraque et al. | |
| 6,083,546 A | 7/2000 | Carrick et al. | |
| 6,103,287 A | 8/2000 | Soehnlen et al. | |
| 6,209,329 B1 | 4/2001 | Jones et al. | |
| 6,216,470 B1 | 4/2001 | Kosock et al. | |
| 6,349,549 B1 | 2/2002 | Angus et al. | |
| 6,491,958 B1 | 12/2002 | Tucker et al. | |
| 6,510,890 B1 | 1/2003 | Paskach et al. | |
| 6,539,743 B2 | 4/2003 | Jones | |
| 7,455,868 B2 | 11/2008 | Kennedy et al. | |

OTHER PUBLICATIONS

Grey, Theodore. Behold the smooth, sweet powers of liquid N (Liquid nitrogen ice cream! Yum!), Popular Science Jul. 2003. p. 1, http://www.freerepublic.com/focus/f-news/930895/posts.*
Darling, Jennifer (ed), Better Homes and Gardens New Cookbook 12th Edition, Merideth Publishing Group Aug. 17, 2004. p. 24.*
Browne, Alaina, When chemists cook, Jul. 24, 2003, p. 1 http://alaina.typepad.com/tigerbunny/2003/07/when_chemists_c.html.*

* cited by examiner

*Primary Examiner* — Jyoti Chawla
(74) *Attorney, Agent, or Firm* — ColterJennings

(57) ABSTRACT

A method of preparing customized micro batches of ice cream is disclosed. Ice cream premix is poured into a shallow eight quart bowl and flavorings and mix-ins added. Liquid nitrogen is injected into the bowl, and the premix is folded into the liquid nitrogen by folding the premix into the center of the bowl. The premix is frozen into ice cream, its edges heated to release any ice cream from the bowl, and dispensed to a serving container. By adding additional liquid nitrogen, the ice cream may be made brittle and then chopped or ground into a large or fine granular shape. As the ice cream mixture is freezing, it may be poured into a mold and placed in a cryogenic bin to freeze and harden the ice cream into the shape of the mold, for making ice cream cakes or other novelty ice cream shapes.

20 Claims, 5 Drawing Sheets

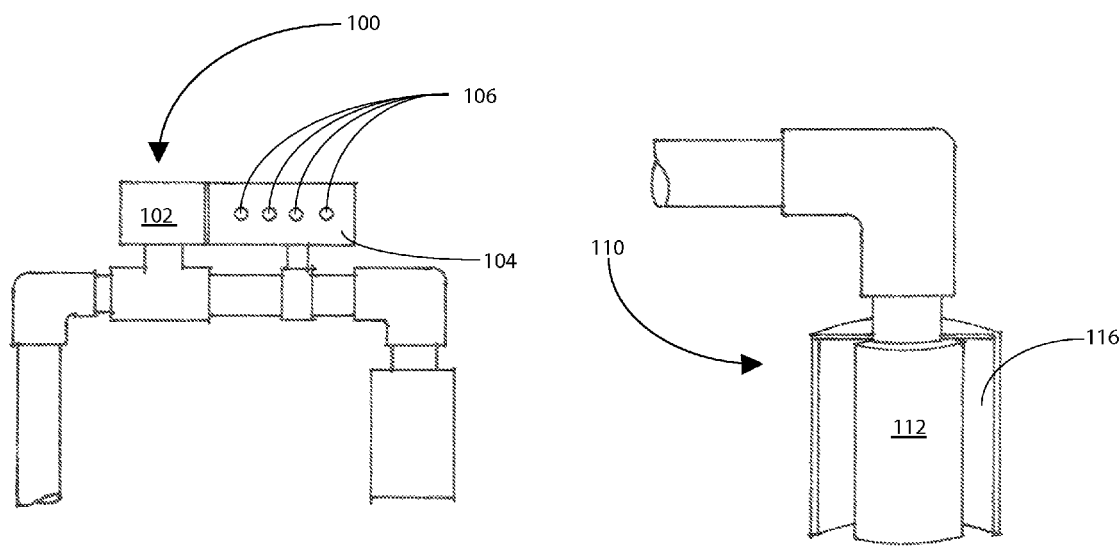
Figure 5
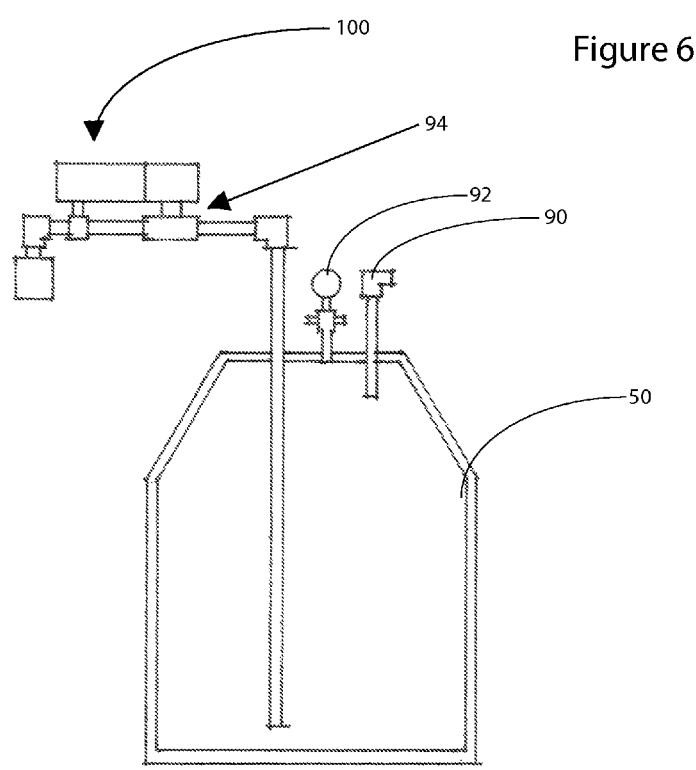
Figure 6
Figure 4

METHOD OF MAKING FROZEN CONFECTIONS

CROSS-REFERENCE TO RELATED APPLICATION

This application claims priority based on U.S. Provisional Patent Application Ser. No. 60/680,439 filed May 12, 2005 and titled "Method for Freezing a Micro Portion of Desert Food Product to Create a Custom Experience."

BACKGROUND

This invention relates to a method and apparatus for preparing frozen confection in micro batch portions, and more particularly to a method of making a custom frozen product for each customer.

Throughout the 20th century ice cream has grown in popularity with the American public consuming about 85% of the world's ice cream. Approximately 60% of that ice cream is purchased from scoop shops, food service and other retail sales outlets. Historically, one common way for retail outlets to provide product is by purchasing pre-frozen product from a manufacturer or using machines that freeze a pre-mix that is then scooped into cups or cones. These methods give the merchant a limited number of flavors, mix-ins, textures, and grades of product.

Premium retailers often use a conventional machine on-site to freeze and store the pre-mix until it is scooped and mixed with mix-ins. In some cases, mix-ins are added to a frozen product by physical mashing with a spade on a frozen stone. The stone aids in keeping the product frozen when mixing the non frozen mix-ins.

As the ice cream mixture freezes, ice crystals form. The shorter the freezing process, the more minute and less detectable the ice crystals. As a result, the faster an ice cream or yogurt product is frozen, the creamier the end product will be. Thus, ice cream manufacturers seek to freeze the product as quickly as possible to produce a richer and creamier product than ice cream frozen using the typical, conventional methods of freezing ice cream.

Previously, frozen dessert products such as ice cream or frozen yogurt have been cooled using conventional refrigeration. This is usually a fairly slow process. Consequently, preparing small batches of frozen ice cream, which may require significant waiting time to permit the ice cream to freeze, has often been rendered impractical.

Furthermore, quick freezing usually requires significant physical contact between the freezing agent and the ice cream mixture. Conventional refrigeration systems typically do not provide such physical contact. Thus, attempts have been made to use cryogenic refrigerants, such as liquid nitrogen, to speed freezing. Unfortunately, this often caused the ice cream mix to freeze uncontrollably, creating a heterogeneous texture while sticking to the mixing containers.

Some prior devices use mechanisms and cryogenic refrigerant to form novelty shapes of cream (see U.S. Pat. No. 5,664,422) or to create a frozen confection in batches larger than could be consumed per customer (see U.S. Pat. No. 6,510,890). Both apparatus disclosed in those patents produce a free flowing product of a certain texture, flavor and consistency.

U.S. Pat. No. 6,510,890 discloses the use of liquid nitrogen in a device to freeze ice cream, but does so in a continuous flow of standard product rather than creating a micro batch of customized product. Batch processing or continuous flow processing does not lend itself to creating custom product in small quantities.

U.S. Pat. Nos. 5,126,256 and 5,664,422 disclose a device that uses liquid nitrogen for preparation and storing a free-flowing frozen dairy product. This process is complex in both design and operation. The resulting product has been frozen into small beads. The beads must be kept sufficiently cold to retain a free-flowing character, and so they must be removed from the mixing chamber with an auger to another container. The beads must also be warmed before consumption. All of this complicates the delivery of the ice cream to the consumer.

Thus, a simpler method that permits the customer to request a particular pre-mix, flavor, mix-in and texture, which mixture is then frozen to the customer's specification in a short time to create a customized product, has been needed. The entire process needs to be simple, scalable, portable, reproducible and quick, to permit serving numerous customers. Because the product is being made according to the request of an individual customer, the portions must also be produced in a micro batch process. The process should also be capable of reducing the startup cost of production, making it portable, and overall more cost-effective.

SUMMARY

The present invention provides a method for making a smooth, customized frozen food product in small micro batches using a cryogenic refrigerant, without causing the end product to be at cryogenic temperatures. According to this method, the customer selects a pre-mix of particular volume and richness, flavors, and mix-in pieces. The premix, flavorings and mix-ins are mixed together in a relatively flat metal bowl.

Using a cryogenic refrigerant, the mixture is frozen in seconds directly in front of the customer, according to the customer's specifications, producing a creamy and flavorful end product. The process freezes a cream mixture using a cryogenic process that is portable, adaptable, and immediate.

A cryogenic refrigerant such as liquid nitrogen is injected into the bowl and the ice cream mixture is folded into the liquid nitrogen. With a generally known amount of ice cream mixture to be frozen, a generally known amount of liquid nitrogen is added. The liquid nitrogen quickly freezes the ice cream mixture as the mixture is being folded together with the liquid nitrogen. The temperature of the final ice cream product may be controlled by using a measured amount of liquid nitrogen and ice cream mixture and stirring to distribute the freezing element throughout the cream, thereby preventing over freezing and uneven texture.

The shape of the bowl allows the refrigerant to cover a large area of the mixture. A spade is used to break the frozen crust and fold the mixture to the center of the bowl. This allows the refrigerant to drop to the bottom of the mixture boiling through the mix until completely evaporated.

Often some of the ice cream mixture becomes frozen to the inner wall of the bowl. In that case, the bottom of the bowl may be slightly heated, such as by inserting the bowl into a second bowl of generally the same size and shape that contains a small amount of lukewarm water. The water adds a controlled amount of heat to the mixture through the bowl, releasing any attached product. Using an ice cream scoop or spade, the ice cream is then ladled into a foam cup, cone, or other container for consumption.

After the ice cream has been prepared, additional liquid nitrogen may be injected into the foam cup to further cool the ice cream, resulting in ice cream that will not melt for a significant time after preparation even in hot weather. When folding the ice cream mixture into the liquid nitrogen, additional liquid nitrogen may be injected into the bowl to give the ice cream a brittle consistency. This brittle ice cream can be chopped or ground into granular particles of various sizes and poured into a foam cup. In addition the frozen product may be placed in forms to form cakes and dipped into the cryogenic refrigerant in order to create a harder layer of ice cream that will insulate the center until consumption.

BRIEF DESCRIPTION OF THE DRAWINGS

Other features and advantages of the present invention will be apparent from reference to specific embodiments of the invention as presented in the following Detailed Description taken in conjunction with the accompanying Drawings, in which:

FIG. 4 is a cut-away side view of a liquid nitrogen dispensing unit used in one embodiment of the invention;

FIG. 5 is a close-up perspective view of a valve control mechanism for the liquid nitrogen dispenser of FIG. 4;

FIG. 6 is a partially cut-away side view of a dispensing nozzle mounted on the liquid nitrogen dispenser of FIG. 4.

DETAILED DESCRIPTION

According to the present invention, a method and apparatus for preparing small batches of frozen dessert, such as ice cream, soy product, or yogurt, involves taking the cream or yogurt and mixing it with liquid nitrogen in a specific shape mixing bowl. The ice cream is mixed with a cryogenic refrigerant, such as liquid nitrogen. The method also employs a novel nozzle for injecting the liquid nitrogen.

Figure 1:
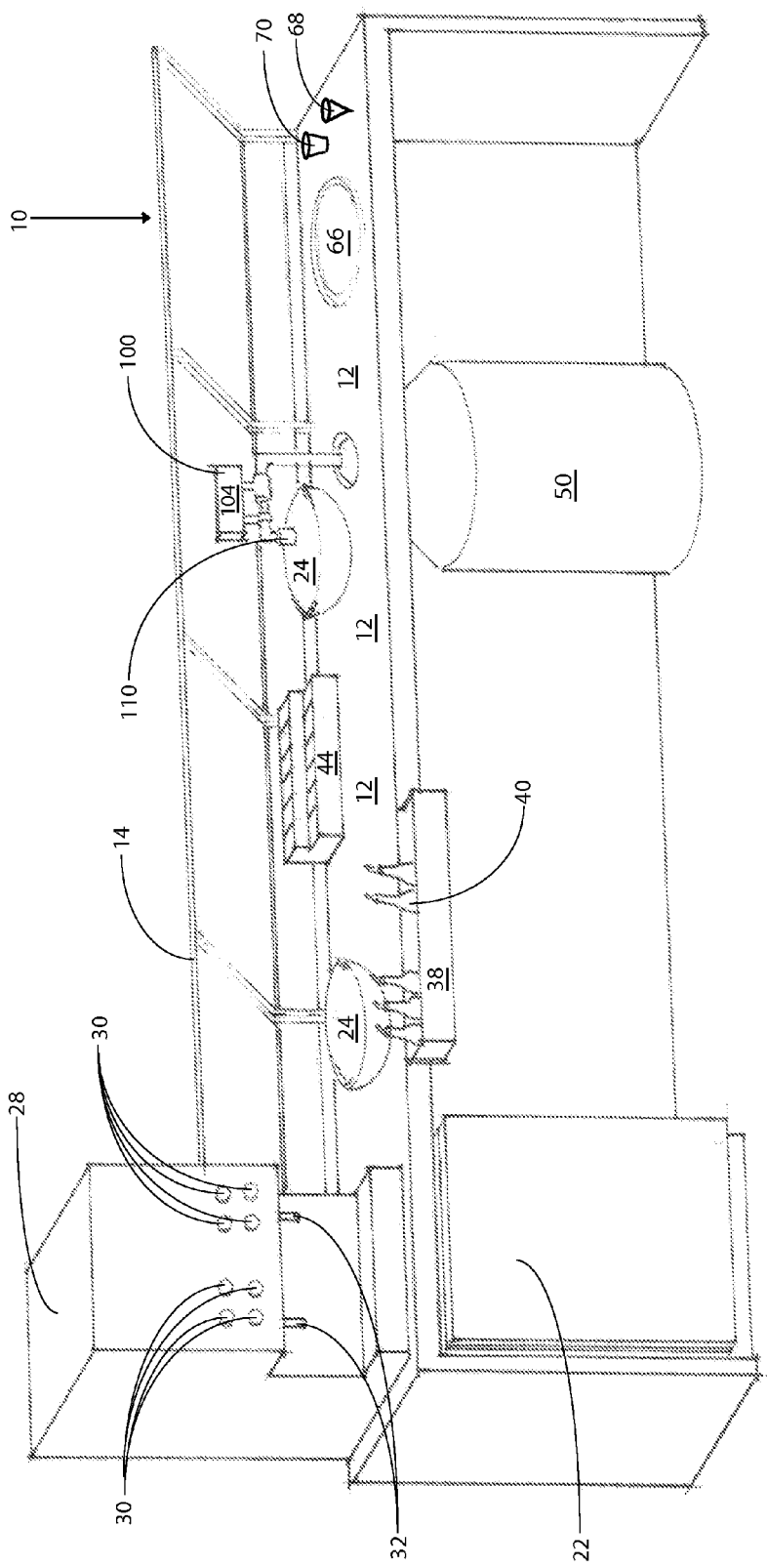
FIG. 1 is a perspective view of a countertop used in preparing batch ice cream servings according to one embodiment of the method of the present invention.

As shown in FIG. 1, a typical counter 10 for dispensing a custom micro batch of ice cream includes a countertop 12 and a glass shield 14. Customers stand in front of the glass shield 14 and order servings of ice cream from one or more workers standing behind the counter 10. The countertop 12 preferably includes a long preparation area.

When a customer orders a serving of ice cream, a worker takes ice cream premix from a refrigerator 22 beneath the counter 10 and pours the proper quantity (based on the quantity of ice cream ordered by the customer) of ice cream premix into an eight quart mixing bowl 24. Alternatively, a cream dispenser 28 may be mounted on the top of the countertop 12. In that case, the worker dispenses premix into the bowl 24 by pushing one or more of a series of buttons 30 on the dispenser 28. The buttons 30 may be programmed to dispense or to pump the correct type and amount of premix through nozzles 32 to the bowl 24, depending on the quantity of ice cream or yogurt or other frozen food product ordered by the customer. In either event, the premix is held within the refrigerator 22 until dispensed, so that the premix stays cool and fresh.

A speed rail 38 mounted on the back of the countertop 12 holds bottles 40 of various ice cream flavorings. A container 44 holding numerous mix-ins is placed on the countertop just below the glass shield 14 so that the mix-ins are immediately viewable by the customer. Mix-ins can be any of several things that customers like to add to provide additional flavor or varied texture to the ice cream serving. Typical mix-ins include diced fruit, nuts, various types of hard or soft candy, chocolate, granola, cheesecake, marshmallows, crushed cookies, cookie dough, and other foods as is known in the art.

The customer specifies the desired flavor or flavors to be added to the premix, and the necessary flavorings are poured into the bowl 24 and mixed with the premix. Typically, the flavoring will be diluted with water because most flavorings are sold in concentrations too high to easily measure the correct amount for an individual serving. Next, the customer orders mix-ins. The worker takes the desired mix-ins from the container 44 and stirs the mix-ins into the premix-flavoring mixture.

In one embodiment of the invention, a liquid nitrogen cylinder dispenser 50 is mounted in the countertop 12 for convenience. Alternatively, a vacuum-jacketed liquid nitrogen feed line can be provided in accordance with methods known in the art of cryogenic liquids. After stirring the mix-ins in with the flavored premix, the worker injects liquid nitrogen from the dispenser 50 into the mixing bowl 24.

Figure 2:
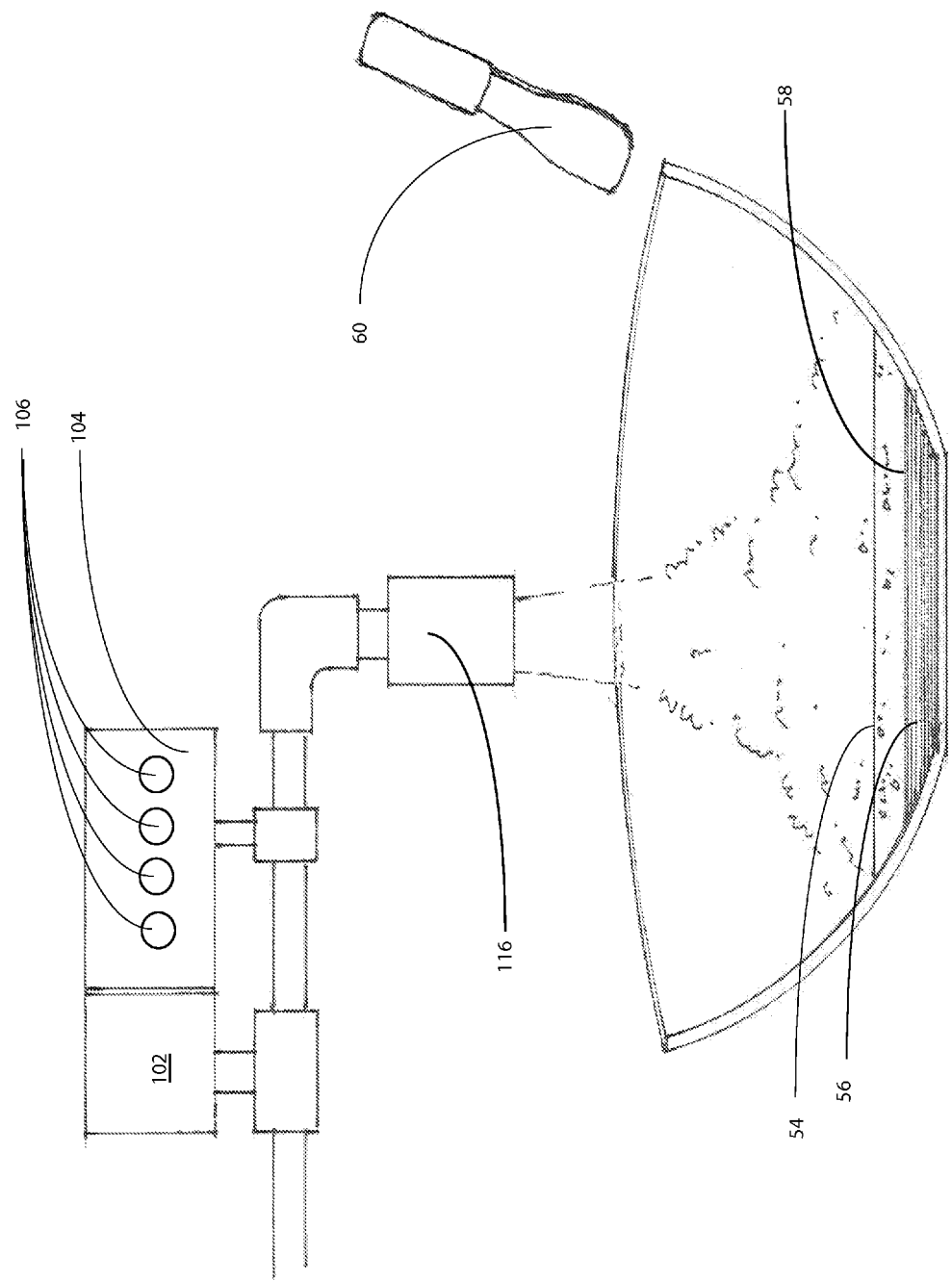
FIG. 2 is a cut-away view of a mixing bowl used to preparing batch ice cream servings according to one embodiment of the method of the present invention.

As depicted in FIG. 2, the liquid nitrogen 54 is injected onto the top of the ice cream-flavoring-mix-in mixture 56. As the liquid nitrogen 54 strikes the mixture 56, a very thin crust 58 of mixture forms on the top surface of the mixture 56. Alternatively, the liquid nitrogen 54 could be injected from the bottom of the bowl 24, but that may require a special valve in each of the bowls 24 or a special nozzle attached to the liquid nitrogen dispenser 50.

The worker immediately begins to fold the mixture 56 and liquid nitrogen 54 together using, preferably, a metal spoon or spade 60. The folding action requires repeated scraping of the spade 60 along the bottom and sides of the bowl 24 to raise the mixture 56 and folding the mixture into itself and into the liquid nitrogen 54. Specifically, the spade 60 breaks the edge of the crust 58, and the mixture 56 is folded toward the center of the bowl 24. This folding is repeated several times to permit quick freezing of the mixture 56 into ice cream.

If the mixture 56 is not quickly folded into the liquid nitrogen 54, the liquid nitrogen will freeze just a portion of the mixture, leaving the remainder in a liquid state or leaving the ice cream with areas of harder and softer consistency. By repeatedly breaking the crust 58 formed at the liquid nitrogen-mixture boundary, the liquid nitrogen 54 flows towards the center of the bowl 24, the mixture 56 is folded toward the center of the bowl and therefore back into the liquid nitrogen. The nitrogen is allowed to fall to the bottom of the bowl and boil through the cream mixture, transferring heat away from the cream.

Typically, ice cream manufacture involves has a certain inflation or overrun. By causing the nitrogen to boil up through the mixture, the end product has the desired inflation without requiring whipping. By dispensing only the amount of nitrogen required to drop the temperature of the premix to a certain hardness, there is little nitrogen left when the process is done. The result is a relatively smooth blending of the mixture while the mixture is rapidly frozen, leading to a consistent ice cream with a very smooth texture.

As the mixture 56 freezes, it tends to stick of the bottom of the metal bowl 24. Thus, when the folding process is nearly complete, the bowl 24 is placed into a melting bowl 66. The melting bowl 66 is also a metal bowl, and preferably is the same type and size bowl as the mixing bowl 24.

A small amount of water is kept in the melting bowl, so that when the mixing bowl 24 with the frozen mixture 56 is put into the melting bowl 66, the water in the melting bowl slightly heats the bottom of the mixing bowl 24, melting the mixture that has frozen to the bottom of the mixing bowl. If the melting bowl 66 is the same general size and shape of the mixing bowl 24, the water in the melting bowl will travel up the side of the mixing bowl and thereby evenly distribute heat to the surface area of the mixing bowl without over-heating. The melted mixture therefore releases from the bottom of the mixing bowl and is folded into the ice cream in the mixing bowl. This slightly softens the ice cream, but a temperature equilibrium is quickly reached. The final product, the serving of ice cream, is then spooned with the spade into a serving container, such as a insulated foam cup 68 or an ice cream cone 70.

Servings of ice cream made according to this embodiment of the invention can be made in varying degrees of hardness. For instance, using a relatively smaller proportion of liquid nitrogen 54 results in a relatively softer serving of ice cream. Using a relatively greater proportion of liquid nitrogen increases the hardness of the resulting serving. All of this can be done to satisfy the particular preferences of the customer.

In any given implementation of this method, some experimentation of premix to nitrogen ratios may be useful, to take into account the variables involved, such as the temperature of the premix in the refrigerator 22, the pressure of the liquid nitrogen exiting the container 50, the ambient temperature, and even the elevation at which the method is being performed. According to the present state of development, it appears best to add a generally set amount of liquid nitrogen to the premix and mix-ins in a single, quick injection; the present state of experimentation indicates that about 1.75 ounces of liquid nitrogen should be used for each ounce of premix. Injecting a series of small amounts of liquid nitrogen into the premix and mix-ins to freeze the ice cream typically results in hard (cold) spots and soft (warm) spots in the ice cream, resulting in an uneven texture. Although small amounts of liquid nitrogen may be added after the first injection, such small injections are mostly useful for further cooling the already frozen ice cream. When in doubt, if too much liquid nitrogen has been added, the excess may be poured off, because the liquid nitrogen and the cream are mutually insoluble.

This basic process results in a smooth, customized serving of ice cream. According to another embodiment of the invention, after the ice cream serving has been spooned into the foam cup 68, additional liquid nitrogen 54 is injected into the cup 68. This additional liquid nitrogen lowers the temperature of the serving, so that the ice cream will stay cold for several minutes after being produced, with no discernable difference in the quality of the flavor or texture of the ice cream once it warms sufficiently to be eaten. This is particularly beneficial when the customer is traveling and, for instance, wants to be able take the serving to a park or to the beach that is several minutes travel distance away from an ice cream shop. In fact, by using enough liquid nitrogen for the re-freezing step, is has been found that the ice cream serving can be kept cold for more than an hour.

According to another embodiment of the present invention, while folding the mixture 56 into the liquid nitrogen 54 the worker also uses the metal spade 60 to chop up the freezing mixture. That is, once the ice cream mixture 56 has mostly frozen during the folding process, additional liquid nitrogen 54 is added to the bowl 24, freezing the mixture sufficiently to become brittle. The spade is then used to chop up the ice cream, resulting in a serving having a granular consistency.

When making ice cream prepared according to this embodiment, typically the worker does not insert the premix bowl 24 into the melting bowl 66, both because the remaining frozen product is brittle enough that it is easily removed by running the spade 60 across the surface of the bowl, and because the resulting mixture 56 is most brittle when no additional heat has been added. A serving made according to this embodiment can often be eaten by hand, without the ice cream melting on the customer's fingers.

Figure 3:
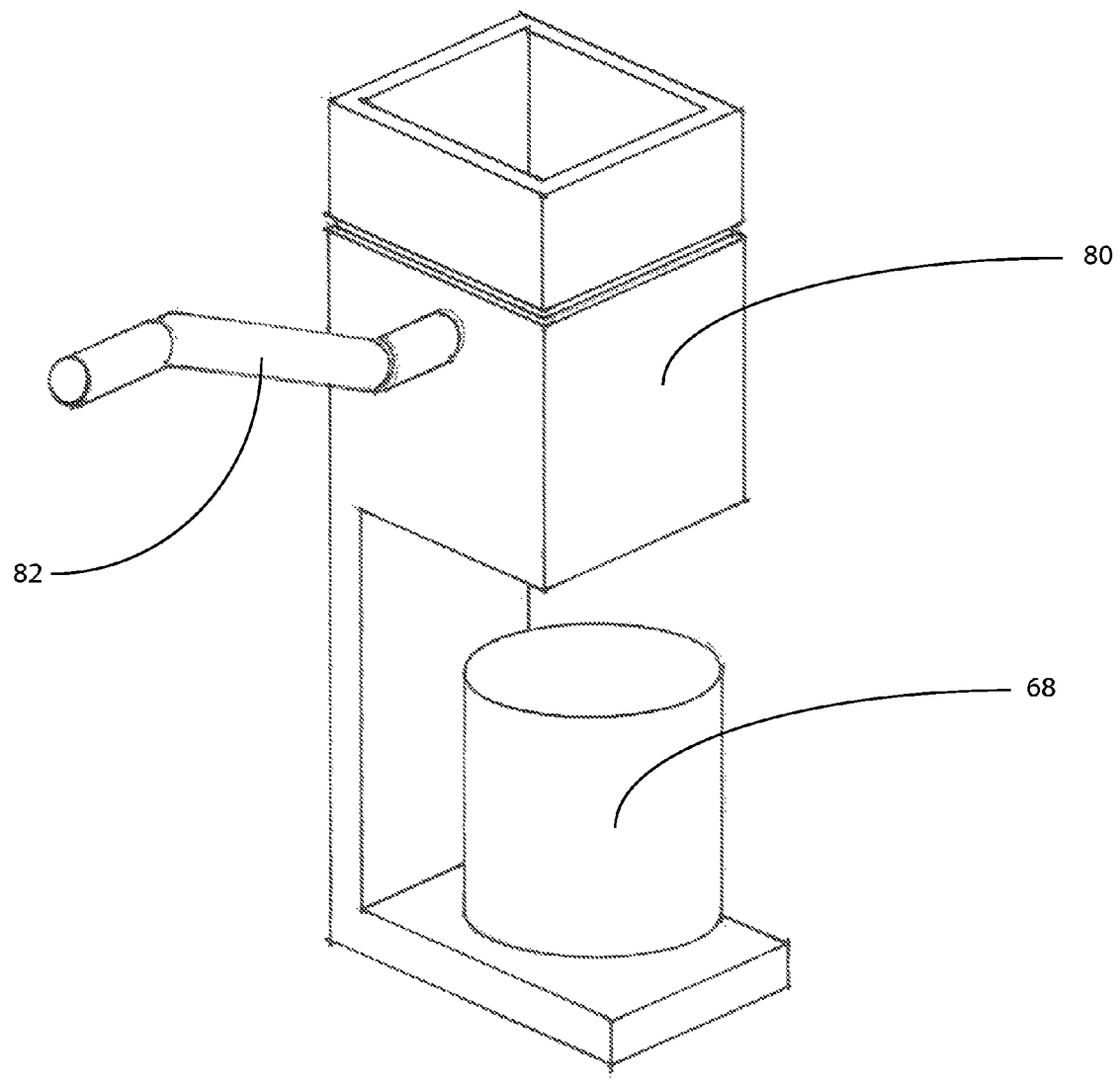
FIG. 3 is a perspective view of a grinder that may be used according to one embodiment of the present invention.

According to yet another embodiment of the present invention, and as depicted in FIG. 3, rather than chopping the ice cream as it freezes using the metal spade, the freezing ice cream mixture 56 can be poured from the bowl 24 into a blender or grinder 80, such as a wheat grinder. When the handle 82 on the grinder 80 is turned, the grinder grinds the mixture 56 into a flour or powdered consistency and the mixture falls into a foam cup 68. Typically, the ice cream is cold enough that any heat from the grinder will not significantly affect the grinding process. However, if needed, additional liquid nitrogen can be poured into the grinder during the grinding process to counteract any heating effects of the grinding process, to keep the ice cream cold and to increase the brittleness, and thus the ease of grinding, of the ice cream. This embodiment of the invention produces a fine powdered ice cream concoction.

As depicted in FIG. 4, the liquid nitrogen dispenser 50 typically includes an input valve 90, a pressure release valve 92 and a dispensing unit 94. The input valve and pressure release valve are typical of those known in the art. An example of a liquid nitrogen dispenser 50 is the model LD 50 liquid nitrogen (Dewar) tank made by Taylor Wharton of Theodore, Ala.

As depicted in FIG. 5, the dispensing unit 94 on the liquid nitrogen dispenser 50 may include a cryogenic solenoid valve 100. A coil 102 mounted on the valve 100 controls the opening and closing of the valve. A controller 104 includes logic circuitry and buttons 106 for controlling the coil 102. Each button 106 may be designed to instruct the coil to open the valve 100 for a specific period of time. As a result, a worker need only push a single button to inject the proper amount of liquid nitrogen into the mixing bowl 24, taking into account such factors as the type and amount of premix used, the flavorings and mix-ins, and the level of hardness of the serving of ice cream desired by the customer. One of the buttons 106 may be a burst button that injects a small amount of liquid nitrogen into the mixing bowl 24 to permit the worker to quickly increase the rate of cooling of the mixture 56.

As depicted in FIG. 6, the dispensing unit 94 feeds the liquid nitrogen to a injection nozzle 110. The injection nozzle 110 includes a standard phase separation nozzle 112 as is known in the art. Although it is possible to use a standard liquid nitrogen dispenser and phase separation nozzle 112, standard phase separation nozzles 112 allow significant amounts of liquid nitrogen to disperse horizontally, and thus much liquid nitrogen is lost to evaporation into the air without falling directly into the mixing bowl 24. Therefore, a copper shield 116 (shown cut-away in FIG. 6) is mounted around the phase separation nozzles 112. This copper shield 116 directs the liquid nitrogen 56 down into the mixing bowl 24, resulting in significantly less wasted liquid nitrogen and increasing the cooling efficiency of the process. The copper shield 116 is preferably constructed in a fashion to permit removal for cleaning.

Figure 7:
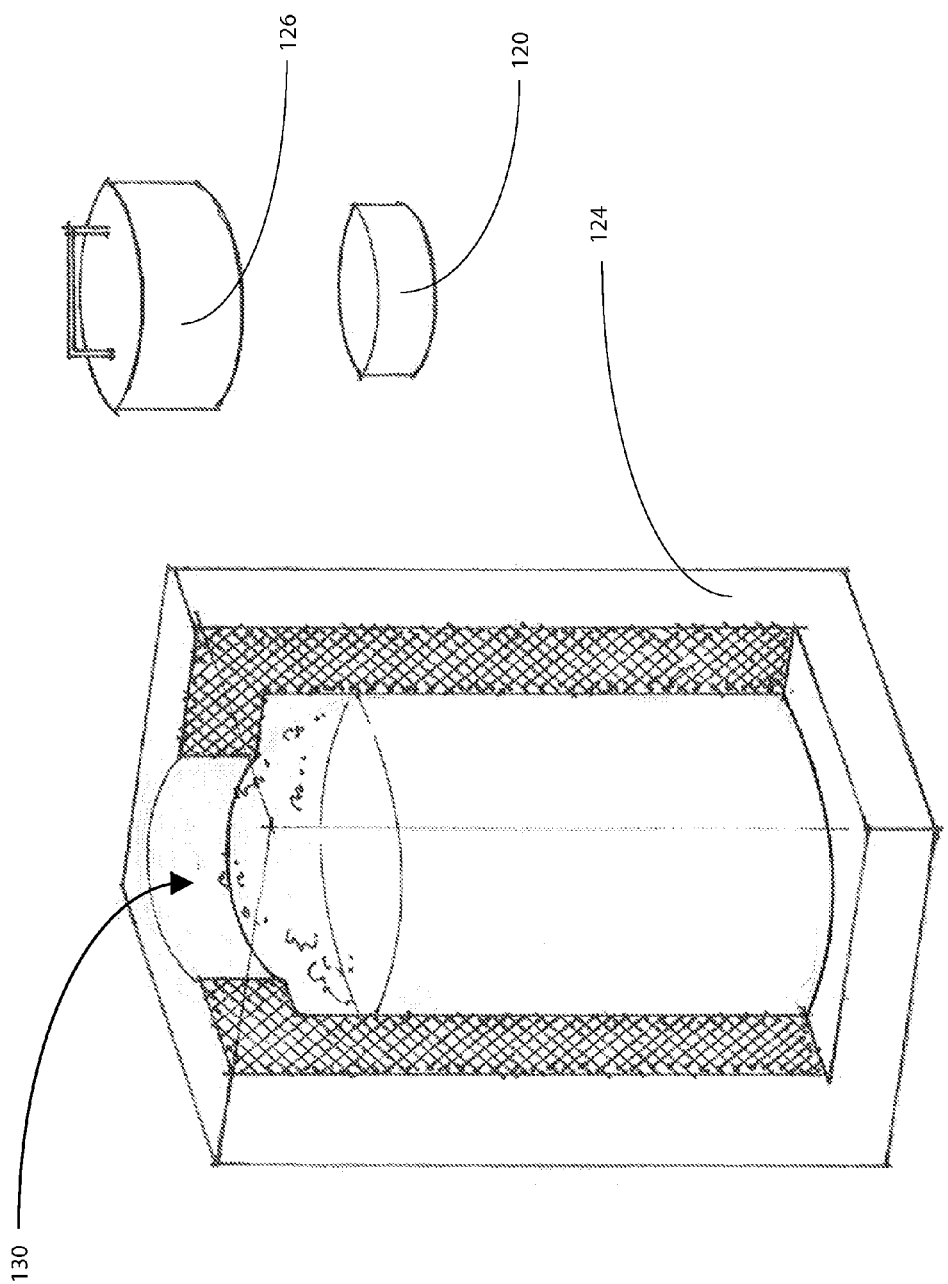
FIG. 7 is a cut-away perspective view of a cryogenic storage container that may be used according to one embodiment of the present invention.

According to another embodiment of the invention, the process is used to make ice cream cakes and other frozen novelty foods. The premix and mix-ins are cooled using liquid nitrogen to a relatively soft consistency, in the manner discussed. As depicted in FIG. 7, the ice cream mixture 56 is then poured into a mold 120, which could be a cake mold or even a mold of animals or toys or other novelty shapes. The mold 120 with the ice cream is placed into a cryogenic freezer 124.

The freezer 124 is one of those known in the art, such as the models MVE 600 and MVE 1400 sold by MVE Biological Systems, a division of Chart Industries. The freezer 124 includes a lid 126 covering an inner bin 130 that is filled with liquid nitrogen. When placed into the bin 130, the ice cream mixture in the mold freezes into the shape of the mold 120. A series of these molds 120, with the same or different ice cream mixtures, can be used to prepare several layers for a cake.

When an ice cream cake is ordered, the worker prepares several molds 120 with the requested flavors of ice cream and places each mold into the freezer 124 for a set period of time, typically 30-60 seconds. The worker pulls the molds 120 out of the freezer 124, briefly dips the mold into a tub of water to release the ice cream from the wall of the mold, and stacks the resulting ice cream layers to make a cake.

Depending on how long the mold 120 is in the freezer 124, the ice cream cake can be made very cold. Thus, the cake can be taken some distance away, such as to the beach or a park, before there is any significant thawing of the ice cream. As the "cake" softens from the outside, it resumes the even texture and consistency of ice cream made according the present invention. Furthermore, because the outer surface of the ice cream has had more direct contact with the liquid nitrogen, the outer surface is significantly colder than the inner portion of the ice cream, resulting in a insulating effect for the entire ice cream cake.

The cream dispenser 28 may be one of those known in the art, such as the model CS-3-A sold by Servolift Eastern Corporation of Boston, Mass. The mixing bowl 24 and the warming bowl 66 are preferably shallow eight quart metal bowls as are commonly known. It is important that the mixing bowl 24 be shallow, as a deep bowl does not allow even transfer of heat leaving some portions of the premix extremely cold (and hard) while other portions remain liquid. The present state of experimentation indicates that the volume of the mixing bowl 24 should be about 20-50 times the volume of the ice cream premix used to make a serving.

The premix can be any of several known in the art. For instance, high fat content or low fat ice cream premix may be used. Also, a custard or yogurt premix may be used, as may soy-based premixes. The amount of liquid nitrogen used to freeze any given type of premix, or mixture of premix, flavorings and mix-ins, varies according to the particular combination ordered by the customer. For instance, yogurt premixes typically require more liquid nitrogen, probably because of the greater percentage water content of yogurt premixes. Typically, with some training, a worker learns to adjust the liquid nitrogen levels based on the premix and additive characteristics.

By using a cryogenic refrigerant, the heat from the premix can be removed in a matter of seconds, making it possible to produce custom batches of frozen confection while serving the masses. This process not only is capable of serving people at rate similar to that of a scooped frozen product, it can also be used in a portable fashion to be made and served in a variety of venues, including fairs, weddings, sporting events, catering and educational presentations. Advantages include being able to create a custom product for each customer, which includes choosing a custom pre-mix, flavors, mix-in, and hardness or texture.

By adjusting the strength of the flavor or mixture of flavors, and adjusting the portions of cryogenic refrigerant, the customer may be provided a serving of ice cream to their specifications. Furthermore, the serving produced has the traditional over-run or inflation of quality ice cream without an airy whipped texture. The inflation is created by the nitrogen boiling from below the cream while mixing, causing large air pockets rather than small foamy pockets of air as with traditional ice cream machines.

Although particular embodiments of the present invention have been described, those of skill in the art will appreciate that various modifications and changes may be made by those skilled in the art without departing from the spirit and scope of the invention.

The invention claimed is:

1. A method of preparing an individual-size customized ice cream serving to be sold on demand comprising the steps of:
   a. mixing a predetermined amount of an ice cream premix, an ice cream flavoring agent, and one or more mix-in foods in a first eight quart metal bowl, the first bowl having a center and a continuous side that forms an inner diameter of the bowl;
   b. dispensing a predetermined volume of liquid nitrogen through a phase separator into the first bowl to float on top of the premix, the volume of liquid nitrogen being determined by considering the volume and desired temperature of the serving of ice cream to be prepared, the volume of liquid nitrogen being at least sufficient to cover the premix and to cause an upper portion of the premix to freeze and form a crust on the boundary of the premix and the liquid nitrogen;
   c. repeatedly breaking the crust formed at the boundary using an ice cream spade and scraping the premix off the side of the first bowl to raise each crust boundary above the liquid nitrogen and plowing each successive crust boundary into the center of the first bowl so that the liquid nitrogen flows under each successive boundary and boils from underneath the solid crusted boundary of the premix, the boiling thereby causing the premix to overrun and to freeze until all the premix, flavoring and mix-in foods reach an equilibrium temperature as ice cream having a completely frozen texture throughout; and
   d. dispensing the ice cream into a serving container.

2. The method of claim 1 further comprising the step of placing the first bowl into a second bowl having the same general shape as the first bowl and having a predetermined amount of water therein, thereby causing the water in the second bowl to melt the outer diameter of the ice cream.

3. The method of claim 1 further comprising the steps of:
   adding additional liquid nitrogen to the first bowl after the serving has sufficiently frozen to cause the ice cream to become brittle; and
   chopping the brittle ice cream into chunks having a predetermined average size.

4. The method of claim 1 further comprising the steps of:
   adding additional liquid nitrogen to the first bowl after the serving has sufficiently frozen to cause the ice cream to become brittle; and
   grinding the brittle ice cream into a relatively fine powder.

5. The method of claim 1 further comprising the steps of:
   placing the serving into a mold of a predetermined shape; and
   bathing the mold in liquid nitrogen to further decrease the temperature of the ice cream serving.

6. The method of claim 1 further comprising the step of dispensing additional liquid nitrogen into the container holding the ice cream serving to further decrease the temperature of the ice cream serving.

7. A method of preparing a serving of ice cream comprising the steps of:
- a. pouring a predetermined amount of an ice cream premix into a mixing bowl;
- b. dispensing a predetermined volume of a liquid cryogenic refrigerant through a phase separator and into the mixing bowl to float on top of the premix, thereby causing an upper portion of the premix to freeze and form a crust where the boundary of said premix and the liquid cryogenic refrigerant;
- c. repeatedly breaking the crust formed at the boundary and scraping the premix off the bowl to raise the premix above the liquid cryogenic refrigerant, thereby repeatedly forming a crust boundary, and plowing each successive boundary into the premix in the mixing bowl and into the cryogenic refrigerant so that the cryogenic refrigerant flows under the boundary and boils from underneath the solid crusted boundary of said premix, the boiling thereby causing said premix to overrun and to completely freeze into an ice cream serving having a completely frozen texture throughout; and
- d. dispensing the ice cream serving into a serving container.

8. The method of claim 7 further comprising the step of warming the bottom of the mixing bowl to cause the outer edge of the ice cream to melt.

9. The method of claim 7 further comprising the step of mixing at least one of an ice cream flavoring agent and a mix-in into the premix prior to dispensing the liquid cryogenic refrigerant.

10. The method of claim 7 further comprising the steps of:
adding additional liquid nitrogen to the mixing bowl after the serving has sufficiently frozen to cause the ice cream to become brittle; and
chopping the brittle ice cream into chunks having a predetermined average size.

11. The method of claim 7 further comprising the steps of:
adding additional cryogenic refrigerant to the mixing bowl after the serving has sufficiently frozen to cause the ice cream to become brittle; and
grinding the brittle ice cream into a relatively fine powder.

12. The method of claim 7 further comprising the steps of:
placing the serving into a mold of a predetermined shape; and
bathing the mold in liquid cryogenic refrigerant to further decrease the temperature of the ice cream serving.

13. The method of claim 7 further comprising the step of dispensing additional cryogenic refrigerant into the container holding the ice cream serving to further decrease the temperature of the ice cream serving.

14. A method of preparing a small batch of ice cream comprising the steps of:
- a. pouring ice cream premix into a mixing bowl;
- b. dispensing a predetermined volume of liquid cryogenic refrigerant through a phase separator and into the mixing bowl on to the top of the premix to cause an upper portion of premix to freeze and form a frozen crust on the boundary of said premix and the liquid cryogenic refrigerant; and
- c. plowing the crust boundary into the mixing bowl by repeatedly scraping the crust off the bowl, thereby repeatedly forming a crust boundary, breaking each crust boundary and raising each crust boundary and plowing each successive crust boundary into said premix and into said cryogenic refrigerant so that the cryogenic refrigerant boils from underneath the premix causing said premix to overrun and to completely freeze into an ice cream batch having a completely frozen texture throughout.

15. The method of claim 14 further comprising the step of warming the bottom of the mixing bowl to release any ice cream frozen to the mixing bowl.

16. The method of claim 14 further comprising the step of mixing at least one of an ice cream flavoring agent and a mix-in into the premix prior to dispensing the cryogenic refrigerant.

17. The method of claim 14 further comprising the steps of:
adding additional cryogenic refrigerant to the mixing bowl after the serving has sufficiently frozen to cause the ice cream to become brittle; and
chopping the ice cream into chunks having a predetermined average size.

18. The method of claim 14 further comprising the steps of:
adding additional cryogenic refrigerant to the mixing bowl sufficient to cause the ice cream to become brittle; and
grinding the brittle ice cream into a relatively fine powder.

19. The method of claim 14 further comprising the steps of:
placing the serving into a mold of a predetermined shape; and
bathing the mold in cryogenic refrigerant to further decrease the temperature of the ice cream.

20. The method of claim 14 further comprising the step of dispensing additional cryogenic refrigerant into the container holding the ice cream serving to further decrease the temperature of the ice cream.

* * * * *